E. O. SCHARTAN.
Lamp Stove.
No. 65,286. Patented May 28, 1867.
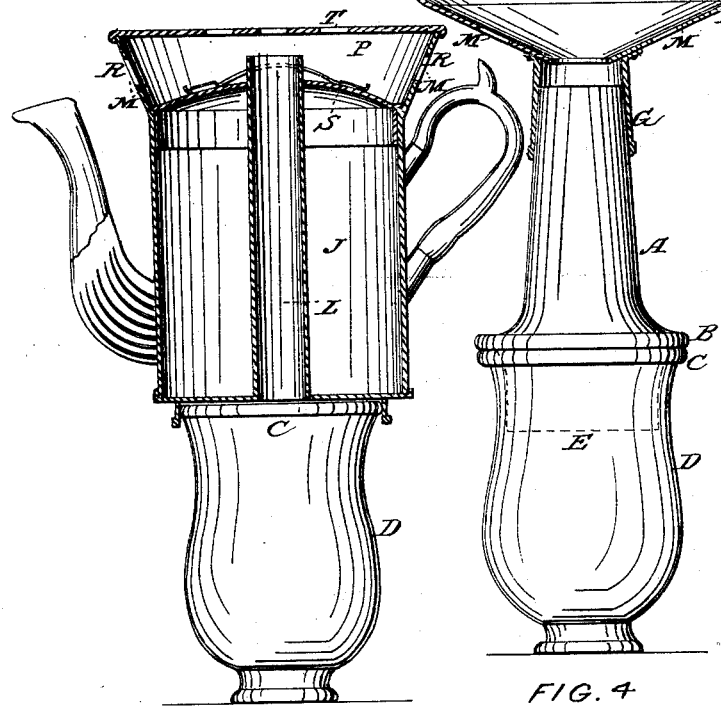
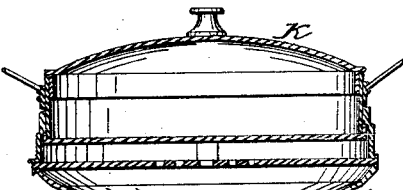
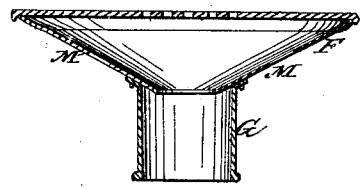
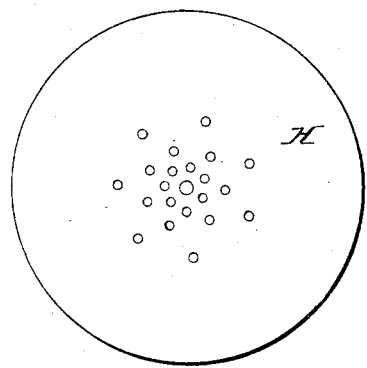
WITNESSES:
INVENTOR:

United States Patent Office.

EJLERT O. SCHARTAN, OF PHILADELPHIA, PENNSYLVANIA.

Letters Patent No. 65,286, dated May 28, 1867.

HEATING ATTACHMENT FOR OIL-LAMPS.

*The Schedule referred to in these Letters Patent and making part of the same.*

TO ALL WHOM IT MAY CONCERN:

Be it known that I, EJLERT O. SCHARTAN, of the city of Philadelphia, and State of Pennsylvania, have invented new and useful improvements in Heaters to to be attached to Oil or Spirit-Lamps; and I do hereby declare the following to be an exact description thereof, reference being had to the accompanying drawings, and to the letters of reference marked thereon, making a part of this specification, in which—

Figure 1 represents the jointed or divided glass chimney with the heater and kettle at top.

Figure 2 represents the glass chimney with the heater and a small boiler at top.

Figure 3, the heater.

Figure 4, a perforated lid.

The nature of my invention consists in the construction of the coffee or tea-pot in combination with the lower half of the chimney.

A represents the cone-top of the glass chimney, with a shoulder, B, to rest upon the flange C of the lower half D, the lower part E fitting into the lower half D of the glass chimney. F represents a heater of metal, cone-shaped, or an inverted cone, with a pipe or tube, G, to fit on the top of the chimney A. A lid, H, with perforations, fits upon the heater F, to heat a small quantity of water for shaving with, or any other use; and the water can be boiled in a few minutes, at very little expense or trouble, and particularly useful for a sick-chamber. The kettle J contains a centre tube, L, and apertures M, for the smoke to pass off, and the heater F has likewise apertures M for the smoke to pass off. The kettle or tea-pot J has a chamber, P, above, formed by a flange, R, and a lid, S, inside, and a lid, T, at top, so that the heat from the chimney D, passing through the pipe L, is condensed in this chamber P, and causes the water in the tea-pot to boil quickly.

What I claim as my invention, and desire to secure by Letters Patent, is—

The chamber P, with the kettle J, with the lower half of the jointed glass chimney, when arranged, used, and combined as herein described and for the purposes set forth.

EJLERT O. SCHARTAN.

Witnesses:
J. FRANKLIN REIGART,
JOHN S. HOLLINGSHEAD.